United States Patent
Gerhard

[19]

[11] Patent Number: 6,086,302
[45] Date of Patent: Jul. 11, 2000

[54] SELF-TAPPING CONCRETE SCREW FOR INSERTION IN AN ASSOCIATED DRILL HOLE IN CONCRETE

[75] Inventor: Anton Gerhard, Nürnberg, Germany

[73] Assignee: TOGE — Dübel A. Gerhard KG, Nürnberg, Germany

[21] Appl. No.: 09/230,284

[22] PCT Filed: Jul. 18, 1997

[86] PCT No.: PCT/EP97/03867

§ 371 Date: Jan. 25, 1999

§ 102(e) Date: Jan. 25, 1999

[87] PCT Pub. No.: WO98/04842

PCT Pub. Date: Feb. 5, 1998

[30] Foreign Application Priority Data

Jul. 29, 1996 [DE] Germany ............................ 296 12 936
Mar. 8, 1997 [DE] Germany ............................ 297 04 226

[51] Int. Cl.[7] .................................................. F16B 25/10
[52] U.S. Cl. .......................................... 411/387.4; 411/424
[58] Field of Search .......................... 411/387.1, 387.4, 411/387.5, 311, 411, 417, 424

[56] References Cited

U.S. PATENT DOCUMENTS

| 2,140,467 | 12/1938 | Cargile | 411/417 |
| 2,679,744 | 6/1954 | MacDonald | 411/411 |
| 3,537,288 | 11/1970 | Ansingh | 411/387.4 |
| 4,439,077 | 3/1984 | Godsted | 411/411 |
| 4,842,467 | 6/1989 | Armstrong | 411/417 |
| 4,850,775 | 7/1989 | Lee et al. | |
| 5,143,498 | 9/1992 | Whitman | 411/311 |

FOREIGN PATENT DOCUMENTS

| 0 433 484 | 6/1991 | European Pat. Off. | |
| 0 623 759 | 11/1994 | European Pat. Off. | |
| 324614 | 4/1903 | France | 411/411 |
| 2543960 | 4/1977 | Germany | 411/387.4 |

*Primary Examiner*—Flemming Saether
*Attorney, Agent, or Firm*—Browdy and Neimark

[57] ABSTRACT

A self-tapping screw, in particular a concrete screw, comprises a cylindrical core with a central longitudinal axis and a thread designed in a single piece with the core and provided, in the area of its periphery, with cutting notches formed by triangles open towards the periphery of the thread. The flanks of the thread extend substantially in parallel to each other radially to the central longitudinal axis.

19 Claims, 1 Drawing Sheet

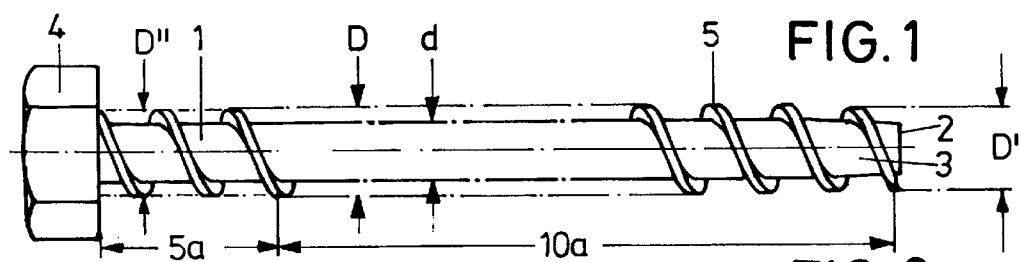
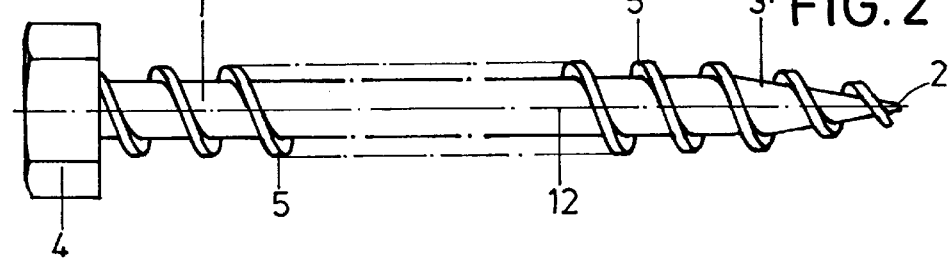
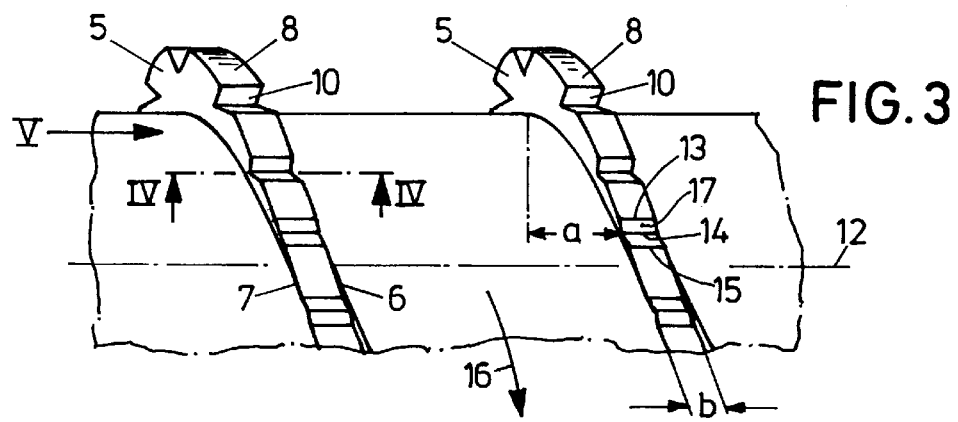
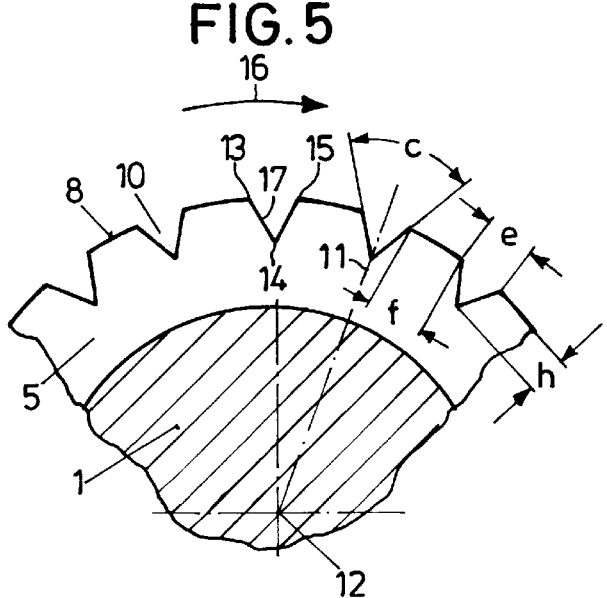
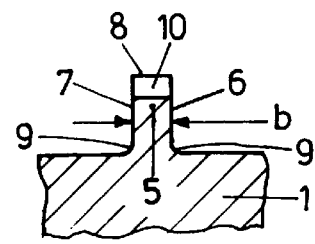
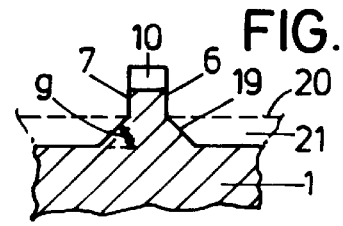

SELF-TAPPING CONCRETE SCREW FOR INSERTION IN AN ASSOCIATED DRILL HOLE IN CONCRETE

BACKGROUND OF THE INVENTION

Technical Field of the Invention

A self-tapping screw is known from EP 0 623 759 B1, in which the ratio which the major diameter bears to the minor diameter is approximately 1.25–1.5, the ratio which the major diameter bears to the pitch lead is approximately 1.5–1.6 and the flank angle of the thread is <50° and >35°.

EP 0 433 484 B1 teaches a self-tapping screw, the thread of which is provided with cutting teeth of approximately bowed design, the central cutting edge being level with the crest of the thread and set negatively.

OBJECT AND SUMMARY OF THE INVENTION

It is an object of the invention to embody a self-tapping screw of the generic type such that it can be screwed especially easily in holes drilled in concrete or other materials such as brick or the like.

According to the invention, this object is attained by the features in the Surprisingly, it has been found that the parallel arrangement of the flanks, i.e. with a flank angle of approximately 0°, will make the screw especially easy-running when screwed in, in particular in the case of hole diameters that vary within the range of admissible tolerances. A reason may reside in that even with varying depths of cutting of the thread into the concrete or the other material, such as bricks, chip boards or hardwood, there is no pressing of the flanks towards the material into which the screw is screwed. The thread is cut over its full width into the material by the cutting notches. In particular one embodiment results in that the material cut out when the screw is screwed in can be delivered outwards without any pile-up.

Further features, advantages and details of the invention will become apparent from the description of exemplary embodiments, taken in conjunction with the drawing, in which

BRIEF DESCRIPTION OF THE DRAWINGS

FIG. 1 is an view of a concrete screw having a slightly tapered end to be inserted;

FIG. 2 is a plan view of a concrete screw having a strongly tapered end to be inserted;

FIG. 3 is a plan view of part of a concrete screw on an enlarged scale as compared to FIG. 1;

FIG. 4 is a cross-sectional view through the thread along the section line IV—IV in FIG. 3;

FIG. 5 is a lateral view of a thread in accordance with the arrow V in FIG. 3; and FIG. 6 is an illustration, corresponding to FIG. 4, of a cross-section through a modified embodiment of the thread.

DETAILED DESCRIPTION OF THE INVENTION

The screw seen in FIG. 1 comprises a cylindrical core 1 having a slightly tapered section 3 in the vicinity of the end 2 to be inserted. A head 4 of arbitrary design is formed on the other end of the core. A thread 5 of web-type design is formed on the cylindrical core 1 inclusive of the tapered section 3, the major diameter D of which exceeds the nominal diameter of a drill hole into which to insert the screw by 1.0–2.5 mm. The nominal diameter of a drill hole is internationally standardized, amounting to 4, 5, 6, 8, 10, 12, 14, 16 . . . mm.

The amount by which the major diameter D exceeds the nominal diameter of the hole grows as the nominal diameter of the hole increases. At the end 2, to be inserted, of the tapered section 3, the major diameter D' of the thread 5 is less than the nominal diameter of the hole by an inferior amount of 0.1–0.2 mm for impeccable insertion not only of the end 2 of the screw, but also of the first flight or the first two flights into a hole to be possible. Subsequent to this first flight or the first two flights, one to two flights are provided as a transition to the thread 5 with the major diameter D. The thread 5 possesses this major diameter D over two to four flights. Subsequently, the major diameter D is again reduced by 0.1–0.2 mm to have a major diameter D", i.e. it still overshoots the nominal diameter of the drill hole. On the whole, the thread 5 is enveloped by an approximately crowned curve. A thread 5 need not forcibly be available in the area neighboring the screw head 4; this applies in particular to comparatively long screws.

In the embodiment according to FIG. 2, the tapered section 3' of the core 1 is drawn to form a tip towards the end 2 to be inserted.

As seen in FIG. 4, the thread 5 has an approximately rectangular cross-sectional shape, i.e. the flanks 6, 7 run parallel to each other. This implies that the flanks 6, 7 enclose an angle of 1° to maximally 2° so as to enable the thread 5 to be removed from the manufacturing tool during manufacture. Such a minute flank angle is exclusively conditioned by reasons of manufacturing implementation. The outer surface 8 of the thread 5 corresponds to a helicoid on a cylinder in as much as the thread 5 is allocated to the cylindrical core 1. The width b of the thread 5, i.e. the shortest distance b of the flanks 6, 7 from each other, is in the range of 0.4–1.5 mm, in particular 0.4–1.0 mm, again in dependence on the nominal diameter of the drill hole.

The flanks 6, 7 pass into the core 1 by small roundings 9. The lead angle a of the thread 5 is in the range of 15 to 30° and preferably in the range of 18 to 26°. The core diameter d is smaller than the nominal diameter of an associated hole by 0.2–0.8 mm.

Cutting notches 10 are formed in the outer surface 8 of the thread 5 over a tapping section 10a which extends from the end 2 to be inserted as far as to where the major diameter D of the thread 5 passes into a reduced major diameter D". Consequently, this latter section of the thread 5 is a non-tapping thread section 5a. In the lateral view according to FIG. 5, the cutting notches 10 have the shape of an isosceles triangle with an apex angle c in the range of 50 to 90° and preferably of 60°. The bisecting line of the apex angle c is formed in each case by a radius 11 drawn to the central longitudinal axis 12 of the core 1. The lengthwise edges 13, 14, 15 of the cutting notches 10, i.e. the two lengthwise edges 13, 15 located at the transition to the outer surface 8 and the lengthwise edge 14 at the apex angle c, run parallel to the axis 12. The lengthwise edge 13, lagging relative to the direction of screwing-in 16, is a cutting edge. The surface formed between this cutting edge 13 and the lengthwise edge 14 which extends along the root of the notch 10 is a delivery surface 17. The radial height h of the cutting notches is in the range of 0.1–0.4 mm, preferably in the range of 0.2–0.3 mm, again in dependence on the nominal diameter of the drill hole.

The cutting notches 10 are formed at a regular distance from each other in the thread 5, $e \leq f \leq 3e$ applying to their peripheral extension e in the peripheral direction as compared to their peripheral distance f.

In the embodiment according to FIG. 6, the flanks 6, 7 pass into the core 1 by means of a bevel 19, the angle g of the bevel amounting to approximately 45°. A wall 20 of a drill hole is roughly outlined by a dashed line in FIG. 6, it being recognizable that the bevel 19 is located at least substantially in the area between the core 1 and the wall 20 of the drill hole. Formed between the core 1 and the wall 20 is a chamber 21 through which the material is delivered which is cut out when the screw is screwed in. These chambers must be as large as possible; consequently, the core diameter d is correspondingly small. These bevels 19 are provided exclusively for reasons of strength, no cutting job having to be performed between the wall 20 of the drill hole and the core 1 and no friction between the flanks 6, 7 of the thread 5 and the wall to be tapped occurring in this area.

The ensuing table illustrates the customary, internationally standardized nominal drill hole diameters (column I), the associated major diameters D of the tapping thread section 10a (column II), the core diameters d (column III) and the associated radial height h of the cutting notches 10 (column IV). It becomes apparent from this table that the major diameter D of the thread exceeds the nominal diameter of the drill hole by 1.5–3.5 mm and increases as the nominal diameter of the drill hole grows. Also the radial height of the cutting notches 10 grows from 0.2–0.8 mm. The dimension by which the core diameter d undershoots the nominal diameter of the drill hole starts at 0.8–1.2 mm for a nominal drill hole diameter of 5 mm, rising to 1.2–1.6 mm in the case of nominal drill hole diameters of 12 mm and more. The reduced major diameter D" of the non-tapping thread section 5a is by 0.1–0.3 mm smaller than the major thread diameter D according to column II.

The cutting notches 10 need not necessarily have the cross-sectional shape of an isosceles triangle; also the delivery surfaces formed between the lengthwise edges 13, 14 and the surfaces formed between the lengthwise edges 14, 15 may be slightly curved, which may result from reasons of manufacturing implementation. As for the rest, the above details apply to the exemplary embodiment according to FIG. 6.

| Column I | Column II | Column III | Column IV |
| --- | --- | --- | --- |
| 5 | 6.5–6.8 | 3.8–4.2 | 0.2–0.5 |
| 6 | 7.5–7.8 | 4.8–5.2 | 0.3–0.6 |
| 8 | 10.5–10.8 | 6.6–7.0 | 0.4–0.7 |
| 10 | 13.0–13.5 | 8.6–9.0 | 0.5–0.8 |
| 12 | 15.0–15.5 | 10.4–10.8 | 0.5–0.8 |
| 14 | 17.0–17.5 | 12.4–12.8 | 0.5–0.8 |
| 16 | 19.0–19.5 | 14.4–14.8 | 0.5–0.8 |

Column I = nominal diameter of drill hole [mm]
Column II = major diameter of thread [mm]
Column III = core diameter [mm]
Column IV = radial height of cutting notches [mm]

What is claimed is:

1. A self-tapping concrete screw adapted for insertion in an associated drill hole in concrete, comprising
    a substantially cylindrical core (1) having a central longitudinal axis (12) and an insertion end (2) adapted to be inserted into the associated drill hole with a nominal diameter, and a head end with a screw head (4), and a core diameter d;
    a thread (5) with flanks (6, 7) and a periphery and a lead angle a, which thread (5) is formed in a single piece with the core (1);
    a tapping thread section (10a) extending from the insertion end (2) including two to four flights of the thread (5) having a maximum outer diameter D and provided with cutting notches (10) disposed in the vicinity of the periphery of the thread (5) and designed in the shape of triangles open towards the periphery and having a root and a radial length h and wherein the flanks (6, 7) extend substantially in parallel to each other radially to the central longitudinal axis (12); and
    a non-tapping thread section (5a) extending from the tapping thread section (10a) and having an outer diameter D" of the thread (5), which outer diameter is reduced by 0.1 to 0.2 mm with respect to the maximum outer diameter D of the tapping thread section.

2. A screw according to claim 1, wherein on its periphery, the thread (5) is provided with an outer surface (8) lying substantially on a surface of a cylinder.

3. A screw according to claim 1 wherein the cutting notches (10) have lengthwise edges (13, 15) at the transition to an outer surface (8) of the thread and a lengthwise edge (14) at the root, which are substantially parallel to the central longitudinal axis (12).

4. A screw according to claim 1, wherein the lead angle a of the thread (5) is in a range of 15 to 30°.

5. A screw according to claim 4 wherein the lead angle a of thread (5) is in preferable range of 18 to 26°.

6. A screw according to claim 1 wherein the major diameter D of the thread (5) exceeds the nominal diameter of an associated drill hole by 1.0–2.5 mm.

7. A screw according to claim 1 wherein at its end (2) to be inserted, it comprises a tapered section (3, 3') of the core (1), along which the thread (5) has a major diameter D' which is smaller than the nominal diameter of the associated drill hole by 0.1–0.2 mm.

8. A screw according to claim 1 wherein the core diameter d is smaller than the nominal diameter of an associated drill hole by 0.2–0.8 mm.

9. A screw according to claim 1 wherein neighboring cutting notches (10) have a peripheral distance f to which e<f<3e applies in relation to a peripheral extension e of the cutting notches.

10. A screw according to claim 1 wherein the radial height h of the cutting notches (10) is 0.1–0.4 mm.

11. A screw according to claim 10, wherein the radial length h of the cutting notches (10) is 0.2–0.3 mm.

12. A screw according to claim 1, wherein the major diameter D of the thread (5) exceeds the nominal diameter of the associated drill hole by 1.5–3.5 mm.

13. A screw according to claim 1 wherein the core diameter d is smaller than the nominal diameter of the associated drill hole by 0.8–1.6 mm.

14. A screw according to claim 1 wherein the radial height h of the cutting notches (10) is 0.2–0.8 mm.

15. A screw according to claim 1 wherein the cutting notches (10) have the cross-sectional shape of an isosceles triangle.

16. A screw according to claim 1 wherein the cutting notches (10) have an apex angle c to which 50°<c<90°, applies.

17. A screw according to claim 16, wherein the cutting notches (10) have an apex angle c to which c=60° applies.

18. A screw according to claim 1 wherein the width b of the thread (5) is 0.4–1.5 mm, in particular 0.4–1.0 mm.

19. A screw according to claim 18, wherein the width b of the thread (5) is 0.4–1.0 mm.

* * * * *